United States Patent
Shimazaki

(10) Patent No.: US 8,184,951 B2
(45) Date of Patent: May 22, 2012

(54) RECORDING AND REPRODUCING APPARATUS

(75) Inventor: Hiroaki Shimazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 12/303,190

(22) PCT Filed: Jun. 11, 2007

(86) PCT No.: PCT/JP2007/061748
§ 371 (c)(1),
(2), (4) Date: Dec. 2, 2008

(87) PCT Pub. No.: WO2007/148555
PCT Pub. Date: Dec. 27, 2007

(65) Prior Publication Data
US 2009/0169186 A1    Jul. 2, 2009

(30) Foreign Application Priority Data
Jun. 20, 2006  (JP) .................... 2006-169763

(51) Int. Cl.
*H04N 9/80* (2006.01)
(52) U.S. Cl. .............. 386/248; 386/335; 360/60
(58) Field of Classification Search .............. 386/248, 386/335; 360/60
See application file for complete search history.

(56) References Cited

U.S. PATENT DOCUMENTS
| 2004/0165864 A1 | 8/2004 | Sawabe et al. |
| 2006/0045494 A1 | 3/2006 | Ono et al. |
| 2007/0031115 A1 | 2/2007 | Oshikiri et al. |

FOREIGN PATENT DOCUMENTS
| JP | 4-268259 | | 9/1992 |
| JP | 5-036196 | | 2/1993 |
| JP | 11-149643 | | 6/1999 |
| JP | 2001-078134 | | 3/2001 |
| JP | 2002185897 A | * | 6/2002 |
| JP | 2004-005776 | | 1/2004 |
| JP | 2004-187051 | | 7/2004 |
| JP | 2004-310833 | | 11/2004 |
| JP | 2005-190617 | | 7/2005 |
| JP | 2005-236643 | | 9/2005 |
| JP | 2006-073038 | | 3/2006 |
| JP | 2007-049247 | | 2/2007 |

OTHER PUBLICATIONS

International Search Report issued Jul. 10, 2007 in the International (PCT) Application of which the present application is the U.S. National Stage.

* cited by examiner

*Primary Examiner* — Thai Tran
*Assistant Examiner* — Girumsew Wendmagegn
(74) *Attorney, Agent, or Firm* — Wenderoth, Lind & Ponack, L.L.P.

(57) ABSTRACT

A recording and reproducing apparatus prevents, when a format instruction is given via an on-screen menu in an image format of one of HDTV and SDTV standards and the content item to be erased is in the other standard, erroneous erasure of a content item on a recording medium having mixed content items recorded using these standards. The recording and reproducing apparatus includes a controlling unit that instructs, upon a user instruction to format via an inputting unit, an image generating unit to generate an on-screen warning, the image generating unit that generates, following the instruction from the controlling unit, the on-screen warning, a display unit that displays the on-screen warning generated by the image generating unit, and a searching unit that searches a disc for a directory recorded using a standard other than used for recording a CONTENTS directory.

12 Claims, 7 Drawing Sheets

Warning

Any SDTV content item seems to be on the disc. Do you want to continue the format operation?

YES  NO

RECORDING AND REPRODUCING APPARATUS

TECHNICAL FIELD

The present invention relates to a recording and reproducing apparatus for recording data such as a video content item on recording media such as DVDs.

BACKGROUND ART

Conventional DVD recording and reproducing apparatuses support video signals only of standard-definition television (SDTV) systems. Such recording and reproducing apparatuses record thumbnail images or content information on discs. When playing the discs, different recording and reproducing apparatuses (or the same recording and reproducing apparatuses as well) can show users the content information on the discs by generating on-screen reproduction menus from the recorded information and displaying them, or by displaying disc menus, configurations of which have been recorded on the discs so that the disc menus can represent on-screen menus as are intended by those who have recorded them.

FIG. 1 shows an example of an on-screen disc menu 700 displayed by a conventional recording apparatus. The conventional on-screen disc menu 700 displays content recorded on a recording medium as a list of thumbnail images so as to allow a user to select a content item with ease. As FIG. 1 shows, the disc menu recorded on the recording medium has a size (particularly, with regard to the number of thumbnail images) appropriate for an SDTV resolution as a standard resolution.

To perform a format operation to erase entire content recorded on a disc using any of such conventional recording and reproducing apparatuses, first the user has an on-screen menu displayed, browses thumbnail images, and judges whether or not each and every content item is necessary. Then the user performs the format operation.

Patent Reference 1: Japanese Unexamined Patent Application Publication No. 2004-5776

SUMMARY OF THE INVENTION

Problems that Invention is to Solve

In recent years, a next-generation disc recording and reproducing apparatus has been commercialized, which is capable of recording using a high-definition television system standard on next-generation, high-density discs. Such a recording and reproducing apparatus is also capable of recording images compatible with standards of a standard-definition television system and images compatible with a high-definition television system on a single disc.

For such a recording and reproducing apparatus, there is a problem that a necessary content item recorded at a resolution or an image size using either of the SDTV-compatible standard with a standard resolution or the HDTV-compatible standard with a high-definition-television resolution will be erased altogether regardless of intention of a user when the user browses an on-screen reproduction menu or a disc menu compatible with only one of these standards and performs an operation to format a recording medium.

In other words, information items to be used for displaying menus according to different recording standards are usually recorded in separate directories; however, there is no recording and reproducing apparatus available today that records images according to the standard-definition television system standard and images according to the high-definition television standard on a single disc. Information items to be used for different menus are therefore not recorded in separate directories on a single disc. Accordingly, in the case where a single disc has mixed content items recorded using the HDTV standard and the SDTV standard, there is a problem that the user will miss a necessary content item recorded using one of these standards and unintentionally erase the content item when the user browses an on-screen menu compatible with the other standard and performs a format operation.

The present invention, conceived to address this problem, has an object of providing a recording and reproducing apparatus that is capable of preventing erroneous erasure of necessary content items recorded using one standard or at one resolution when a user browses an on-screen menu or a disc menu compatible with the other standard or the other resolution and performs a format operation for content items, specifically in the case where the user uses a recording medium that supports recording of content items in different standards or at different resolutions.

Means to Solve the Problems

In order to achieve the above-mentioned object, a recording and reproducing apparatus performs a process on a recording medium on which content items having different resolutions can be recorded, and includes: a detecting unit configured to detect a format operation instruction from a user; and a warning unit configured to issue a warning when the detecting unit detects the format operation instruction, the warning indicating whether or not the recording medium contains a content item having a resolution different from a resolution of a content item upon which the format operation instruction is given.

This configuration will prevent erroneous erasure of an SDTV-resolution content item that a user wishes to save by using the detecting unit and the warning unit when, for example, a recording medium can be recorded with content items having different resolutions. The detecting unit detects a format operation performed as a result of browsing an on-screen reproduction menu or a disc menu only of an HDTV resolution. The warning unit issues to the user a warning that indicates whether or not the recording medium has a content item recorded at a different resolution.

Further, the recording and reproducing apparatus includes a searching unit configured to search the recording medium, when the detecting unit detects the format operation instruction, for the content item recorded at the different resolution, wherein the warning unit is configured to issue the warning only when the searching unit finds the content item recorded at the different resolution.

This configuration will have the warning unit issue a warning only when the searching unit searches a recording medium for a content item recorded using a resolution different from a resolution upon which a format operation is made, and the searching unit finds such a content item.

In order to achieve the object, the present invention can be embodied as a recording and reproducing method that has characteristic units of the recording and reproducing apparatus as steps, or as a program that causes a computer to execute the steps. Obviously, such a program can be distributed via recording media such as CD-ROMs or transmission media such as the Internet.

EFFECTS OF THE INVENTION

A recording and reproducing apparatus according to the present invention enables preventing erroneous erasure of a necessary content item recorded using one standard or at one resolution when a user browses an on-screen menu or a disc menu compatible with the other standard or the other resolution and performs a format operation, specifically in the case where the user uses a recording medium that supports recording of content items in a different standard or at a different resolution.

BRIEF DESCRIPTION OF DRAWINGS

FIG. 7 shows an example of an on-screen warning displayed on a display unit of the recording and reproducing apparatus according to the embodiment.

NUMERICAL REFERENCES

Figure 1:
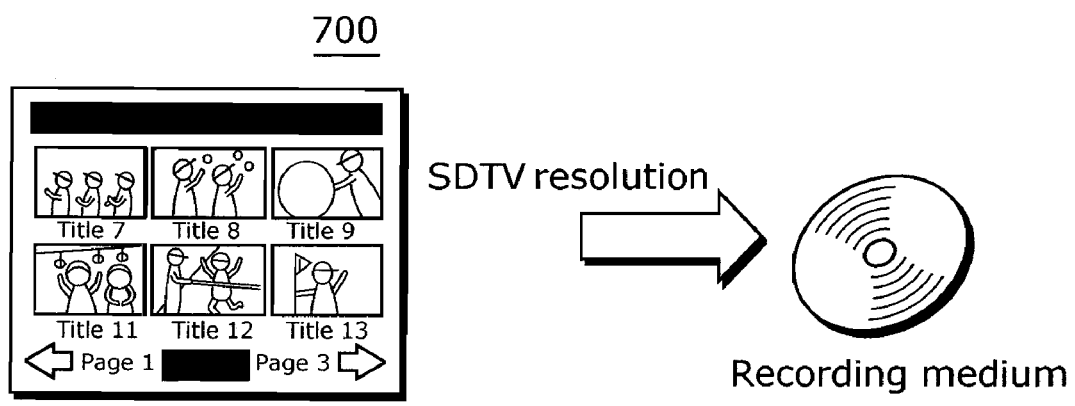
FIG. 1 shows an example of an on-screen disc menu displayed by a conventional recording apparatus.

10 Recording medium
100 Recording and reproducing apparatus
101 Group of lenses
102 Imaging unit
103 A/D converting unit
104 Video signal processing unit
105 Compressing-multiplexing unit
106 Recording processing unit
108 Recording controlling unit
109 Inputting unit
110 Controlling unit
111 Image generating unit
112 Display unit
113 Video signal processing unit
114 Demultiplexing-decompressing unit
115 Reproducing processing unit
116 Searching unit

DETAILED DESCRIPTION OF THE INVENTION

Hereinafter, an embodiment according to the present invention is described with reference to figures.

(Embodiment)

Figure 2:
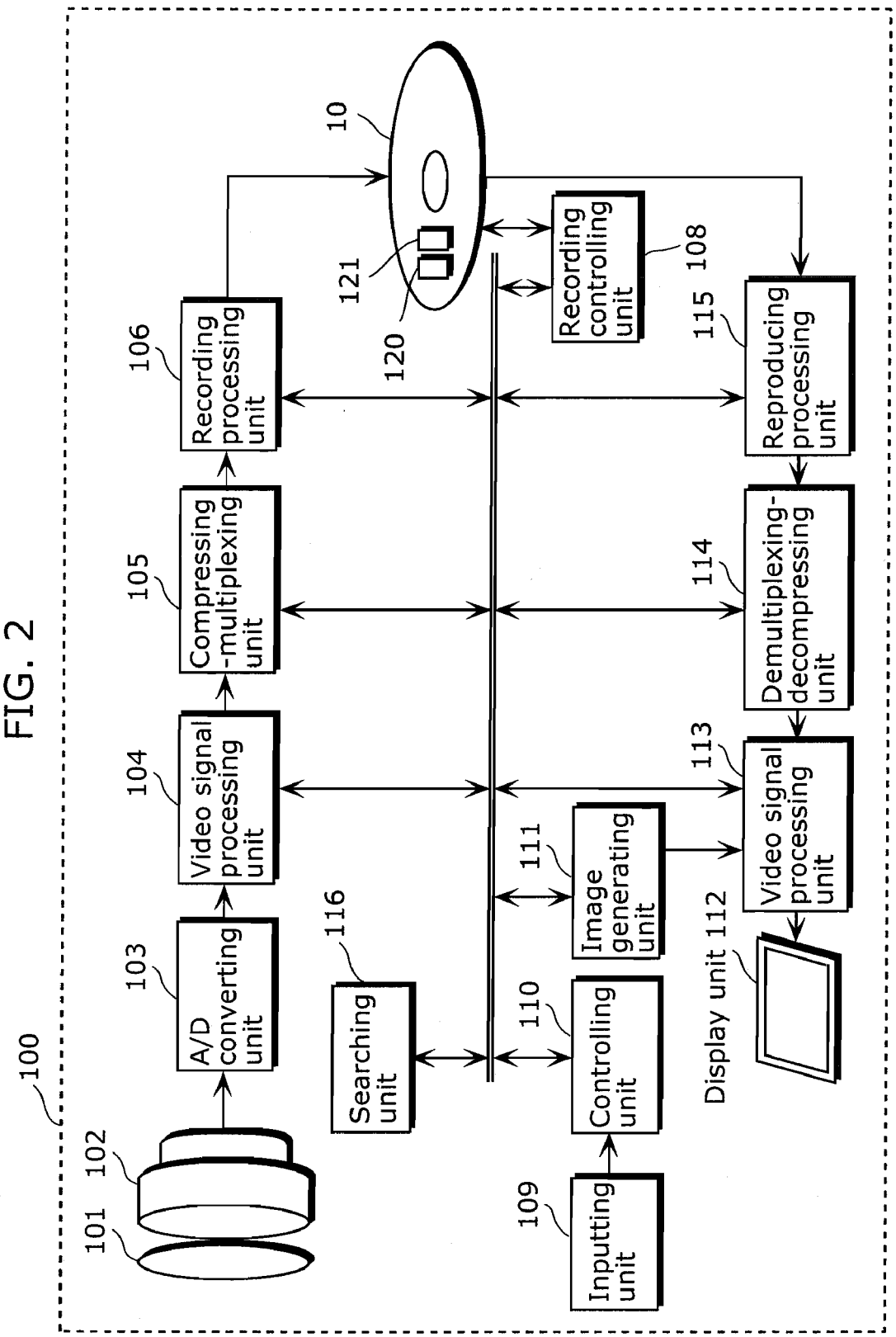
FIG. 2 shows a hardware configuration of a recording and reproducing apparatus according to an embodiment of the present invention.

FIG. 2 shows a hardware configuration of a recording and reproducing apparatus 100 according to the present invention.

A recording and reproducing apparatus 100 according to the present embodiment includes a group of lenses 101, an imaging unit 102, an A/D converting unit 103, a video signal processing unit 104, a compressing-multiplexing unit 105, a recording processing unit 106, a recording controlling unit 108, an inputting unit 109, a controlling unit 110, an image generating unit 111, a display unit 112, a video signal processing unit 113, a demultiplexing-decompressing unit 114, a reproducing processing unit 115, and a searching unit 116.

The recording and reproducing apparatus 100 according to the present invention (i) issues a warning that indicates whether or not a disc contains a content item recorded using one of an HDTV-compatible or an SDTV-compatible standard, or (ii) detects whether or not there is a folder recorded using one of these standards, when a user performs a format operation, which erases all the content items on a disc having mixed content items recorded using both of the standards, via an on-screen menu compatible with only one of the standards.

The disc described in the present embodiment has mixed content items recorded on a single disc using the different standards. The standards may be substituted by other information such as regarding resolutions or image sizes.

The group of lenses 101 includes a plurality of optical lenses.

The imaging unit 102 includes an imaging device and captures an image entering via the group of lenses 101. The captured image is outputted as an analog signal to the A/D converting unit 103.

The A/D converting unit 103 converts the analog signal outputted from the imaging unit 102 to a digital signal. The digital signal obtained through the conversion is outputted to the video signal processing unit 104.

The video signal processing unit 104 converts, into a video signal, the digital signal outputted from the A/D converting unit 103. The video signal obtained through the conversion is outputted to the compressing-multiplexing unit 105.

The compressing-multiplexing unit 105 compresses and multiplexes the video signal outputted from the video signal processing unit 104 using a coding method such as MPEG-2 or H.264. The video signal obtained through the multiplexing is outputted as content to the recording processing unit 106.

The recording processing unit 106 records the content outputted from the compressing-multiplexing unit 105 on a recording medium 10.

The recording controlling unit 108 controls a driving apparatus that drives the recording medium 10.

The inputting unit 109 receives user operations via an inputting device. The format operation is one of such user operations. The inputting unit 109 and the controlling unit 110 constitute a detecting unit. The inputting unit 109 outputs the received user operation as operation information to the controlling unit 110.

The controlling unit 110 controls the video signal processing unit 104, the compressing-multiplexing unit 105, the recording processing unit 106, the recording controlling unit 108, the image generating unit 111, the video signal processing unit 113, the demultiplexing-decompressing unit 114, and the reproducing processing unit 115 so that the recording and reproducing apparatus 100 can execute processes such as recording and reproducing. The controlling unit 110 and the image generating unit 111 constitute a warning unit where the controlling unit 110, upon receiving the format operation instruction from a user via the inputting unit 109, instructs the image generating unit 111 to generate an on-screen warning.

The image generating unit 111 generates an on-screen menu that lists content items recorded on a recording medium 10. The image generating unit 111, following the instruction from the controlling unit 110, also generates an on-screen warning to the user when the user performs a format operation.

The display unit 112 displays, on a monitor or the like, a video signal outputted from video signal processing unit 113 and the on-screen warning generated by the image generating unit 111.

The video signal processing unit 113 converts decompressed content outputted from the demultiplexing-decompressing unit 114 into a video signal. The video signal obtained through the conversion is outputted to the display unit 112. The video signal contains a signal to display the on-screen warning. The video signal processing unit 113 also outputs the menu image generated by the image generating unit 111 to the display unit 112 as a video signal, multiplexing the menu image with the decompressed content outputted from the demultiplexing-decompressing unit 114 when needed.

The demultiplexing-decompressing unit 114 demultiplexes and decompresses, according to the coding method that the compressing-multiplexing unit 105 has used, such as MPEG-2 or H.264, content outputted from the reproducing processing unit 115. The decompressed content is outputted to the video signal processing unit 113.

The reproducing processing unit 115 reads the content to be reproduced from the recording medium 10. The read content is outputted to the demultiplexing-decompressing unit 114.

The recording medium 10 includes content 120 and the administrative information 121 regarding the content. The administrative information contains menu information according to which a disc menu image is generated. Also contained in the administrative information are reproduction order information and auxiliary information regarding partial reproduction and special reproduction.

The searching unit 116 searches a disc, when, for example, an on-screen menu is being displayed using a CONTENTS directory compatible with a specific recording standard, for a directory or a file compatible with a recording standard different from the specific recording standard (or with a standard not used for displaying the on-screen menu). When a directory recorded in such a different standard is found on the disc, the searching unit 116 instructs the image generating unit 111 to generate an on-screen warning. The image generating unit 111 transmits the generated on-screen warning to the video-image processing unit 113 so that the display unit 112 displays the on-screen warning. In the description of the present embodiment, the on-screen warning to the user on the display unit 112 about performing a format operation may be substituted by a warning to the user in a different method, such as a beep.

The present embodiment is described presuming that the searching unit 116 of the recording and reproducing apparatus is capable of searching for data recorded on the disc in any standard, but the present invention is not limited to this. Warning needs to be issued also when an unknown directory or data is found recorded on the disc.

Figure 3:
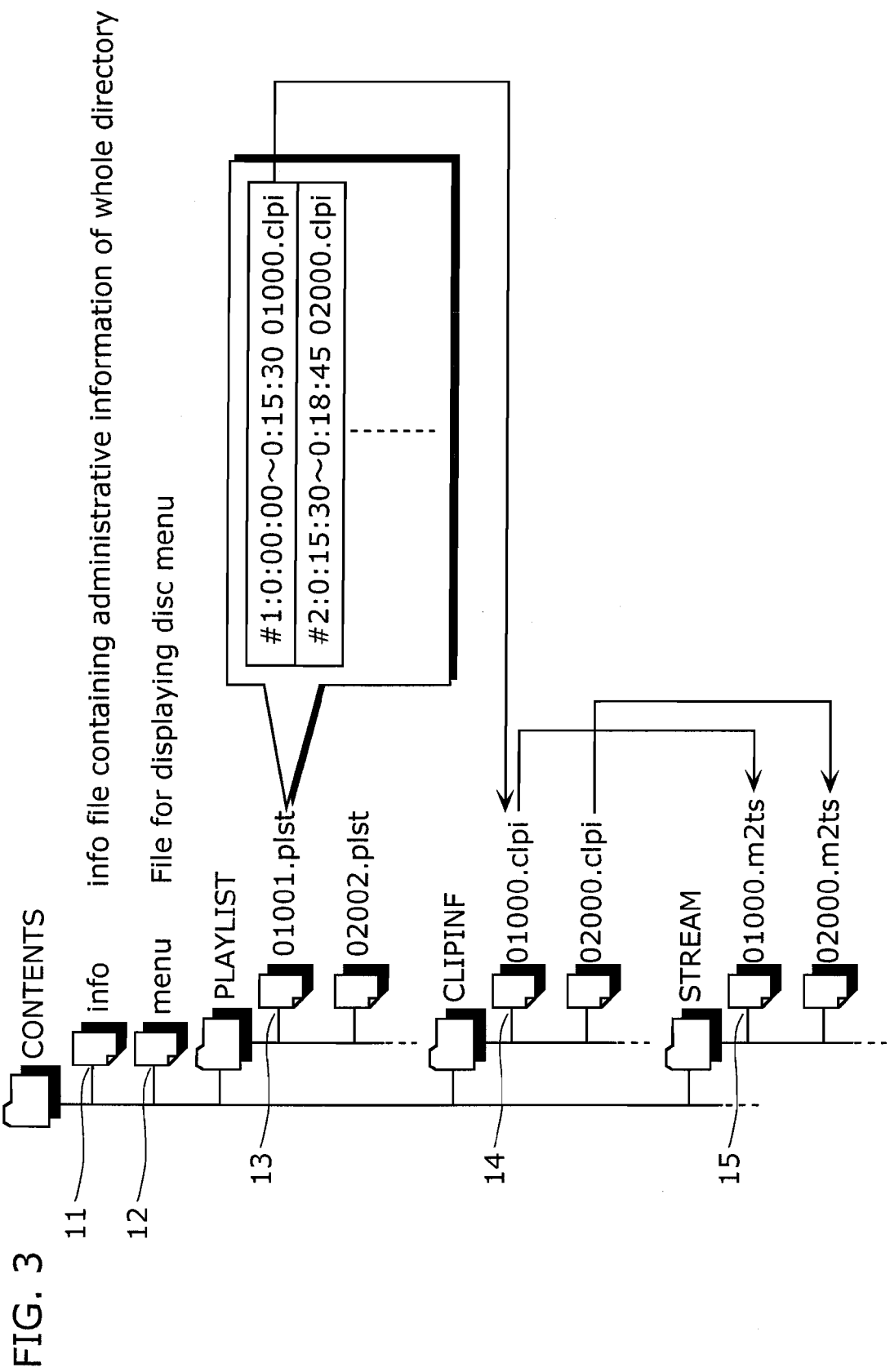
FIG. 3 shows a file structure of an image format based on one of the standards recorded on a recording medium according to the embodiment of the present invention.

FIG. 3 shows a file structure of an image format based on one of the standards recorded on the recording medium according to the present embodiment.

As shown in FIG. 3, a content folder (CONTENTS) exemplarily contains an info file 11 (info), a menu file 12 (menu), a play list folder (PLAYLIST), a clip info folder (CLIPINF), and a stream folder (STREAM), which constitute a file structure compatible with an HDTV image. The info file 11 (info) contains administrative information of a whole directory. The menu file 12 (menu) contains information for constructing a menu.

The play list folder (PLAYLIST) contains play list files such as a file 13 (01001.plst). The play list file 13 (01001.plst) contains information regarding the reproduction order of content items.

The clip info folder (CLIPINF) contains clip info files such as a file 14 (01000.clpi). The clip info file 14 (01000.clpi) contains a time table that enables partial reproduction and special reproduction by associating time information with locations of video data items.

The stream folder (STREAM) contains stream files such as a file 15 (01000.m2ts). The stream file 15 (01000.m2ts) contains audio and visual data.

The controlling unit 110 controls reproduction using files of three different types: the play list file 13, the clip info file 14, and the stream file 15.

The play list file lists clip info files to be reproduced and a reproduction time. When the play list file is reproduced, a specified clip info file is referred to and a stream file specified in the information in the time table is reproduced. For example, the play list file (01001.plst) specifies a reproduction order as a clip (#1) followed by a clip (#2). Here, for the clip (#1), the stream file (01000.m2ts) associated with the clip info file (01000.clpi) is reproduced. For the clip (#2), the stream file (02000.m2ts) associated with the clip info file (02000.clpi) is reproduced.

Figure 4:
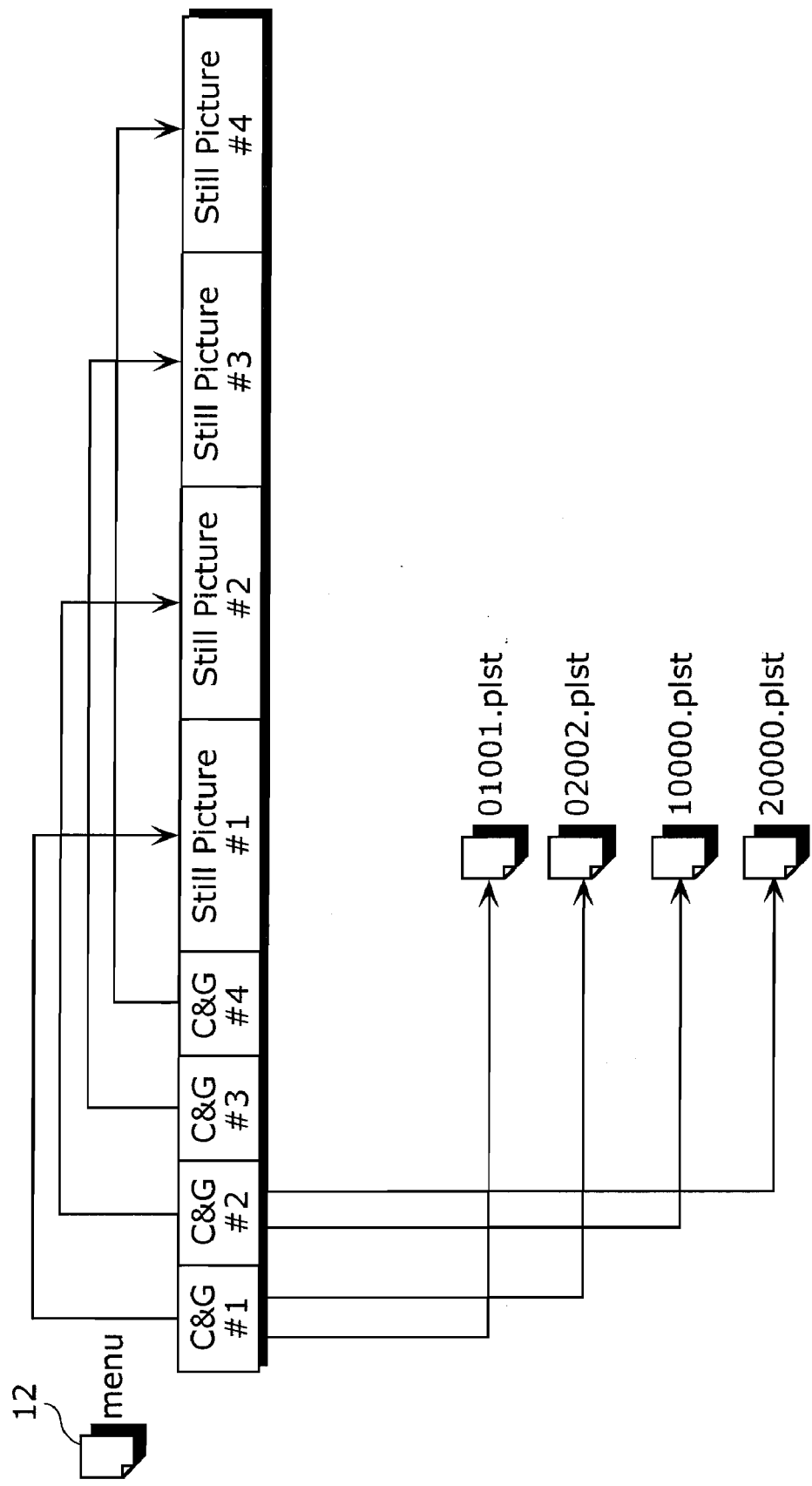
FIG. 4 shows a data structure in the menu file according to the embodiment of the present invention.

FIG. 4 shows a data structure in the menu file 12 according to the present embodiment. As shown in FIG. 4, described in the menu file 12 is a disc menu that lists the content items on the recording media 10 on one or more pages (see FIG. 5, for example).

Shown here is an example where the menu file 12 contains a series of C&Gs: C&G#1, C&G#2, C&G#3, and C&G#4, in this order from a beginning of the file. The C&Gs are associated with the play list files, respectively. The C&Gs are followed by Still Pictures such as Still Picture#1, Still Picture#2, Still Picture#3, and Still Picture#4, which are associated with the C&Gs, respectively. The C&Gs are data that include control information and image information.

The Still Pictures are data obtained through coding a background picture of the menu. An image that forms the background picture, such as a frame or a button, is associated with a command for controlling display of the menu.

For example, according to the C&G#1, the recording and reproducing apparatus 100 displays a menu on a first page that has, on a background picture thereof, thumbnail images of clips specified in the play list file (01001.plst). When a user operation to display a menu on a next page is accepted while the menu on the first page is displayed, a similar process is executed on the C&G#2 that follows the C&G#1. Specifically, a menu on a second page that has, on a background picture thereof, thumbnail images of clips specified in the play list file (02002.plst) is then displayed. The same applies to the C&G#3 and the C&G#4 that follow the C&G#2.

Figure 5:
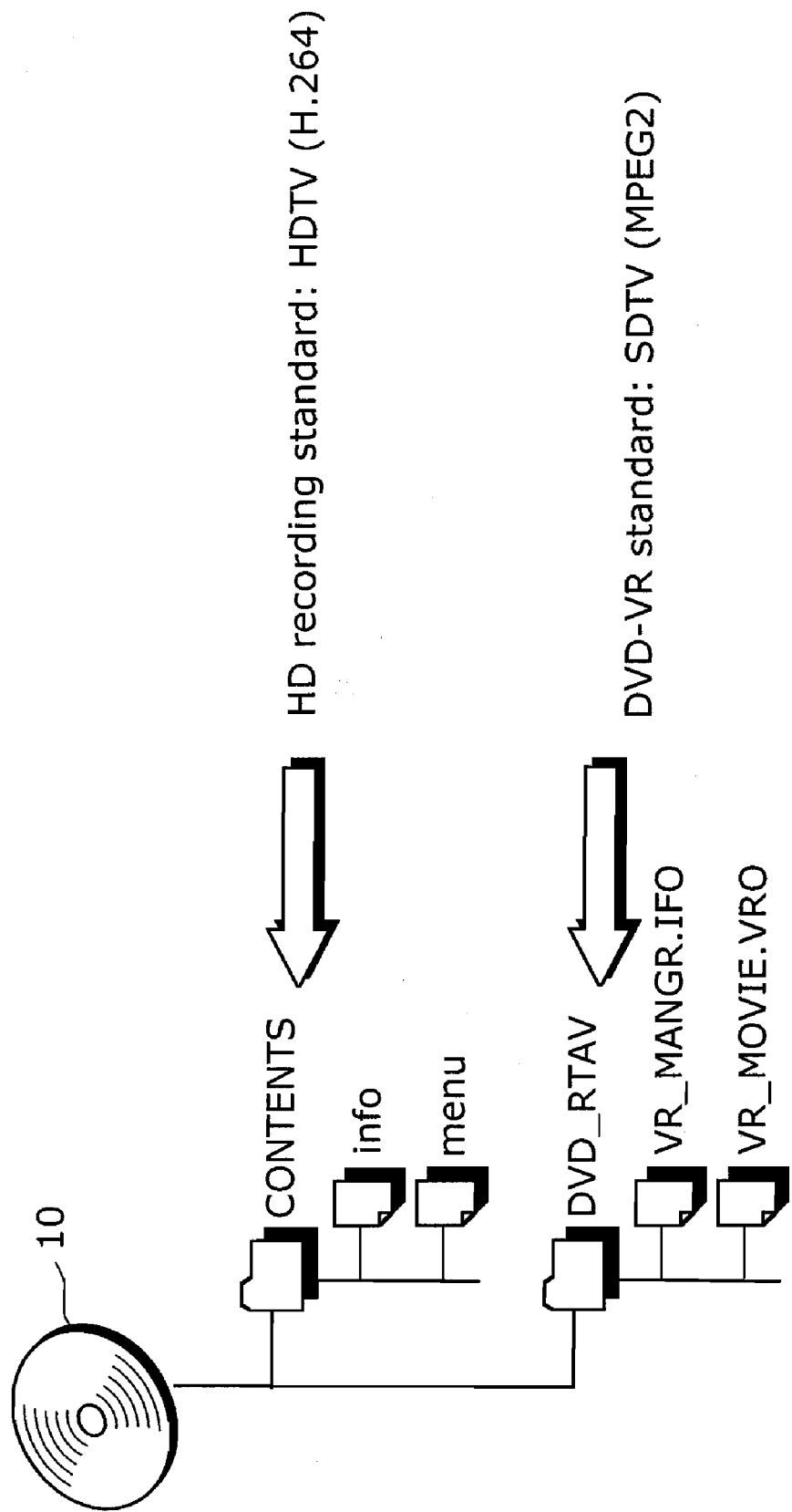
FIG. 5 shows an exemplary file structure on the recording medium according to the embodiment of the present invention.

FIG. 5 shows an exemplary file structure on the recording medium 10 according to the present embodiment. A single DVD 10 is recorded with two directories: one directory contains an HDTV image recorded using an image compression technique with a high compression rate such as H.264, and the other directory contains an SDTV image recorded using a conventional MPEG2 compression technique.

Shown here is that a disc menu recorded in the directory using an HD recording standard lists only HDTV content items, and that a disc menu recorded in the directory using a DVD-VR standard lists only SDTV content items.

For example, when the disc 10 containing a menu file recorded with a disc menu compatible with HDTV content as exemplified in FIG. 3 and FIG. 4 is loaded on the recording and reproducing apparatus 100, the controlling unit 110 reads the menu file in the CONTENTS directory. The controlling unit 110, according to the C&G#1, uses the Still Picture#1 for the background picture, superimposes the image information such as of the arrow, the frame, or the like on the background picture, and displays an on-screen menu 160 in HDTV image format. The SDTV image content in the DVD_RTAV directory is not displayed in the on-screen menu at this time. Accordingly, when the user makes sure that no thumbnail image to save is found in the menu and then performs a format operation, the content in the DVD_RTAV directory will be erased without the details thereof being checked.

In order to avoid such unintentional erasure of content, the controlling unit 110 of the recording and reproducing apparatus 100 according to the present embodiment provides a warning, upon the format operation by the user, that a content item having an image size different from that of items being displayed may be erased. Alternatively, the controlling unit 110 checks the disc 10 for a directory incompatible with a standard or a resolution used for the CONTENTS directory while, for example, a disc menu is being displayed using the CONTENTS directory, and executes a control for displaying an on-screen warning when such a directory is found.

Figure 6:
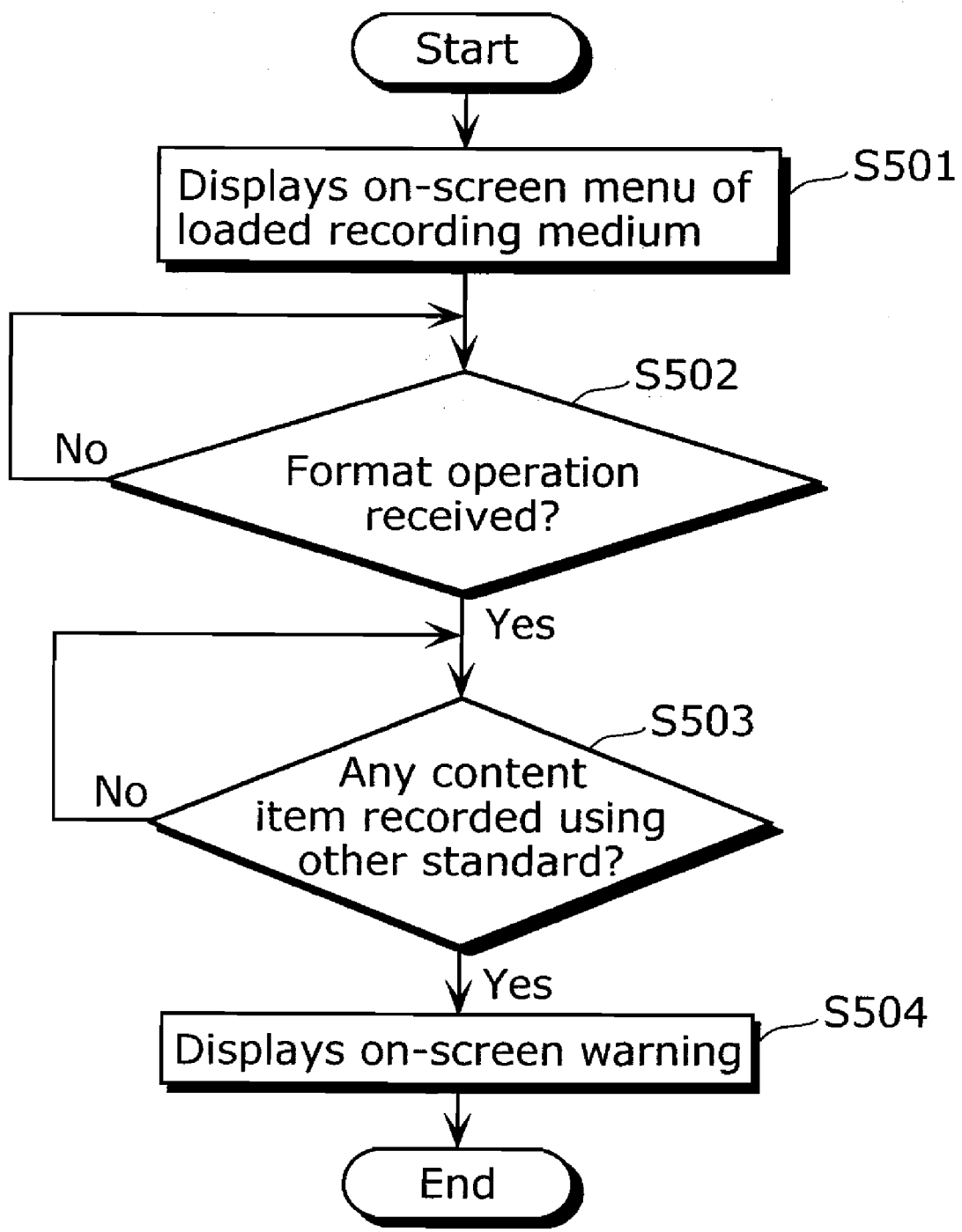
FIG. 6 is a flow chart showing an operating procedure of the recording and reproducing apparatus according to the embodiment upon a format operation.

FIG. 6 is a flow chart showing an operating procedure of the recording and reproducing apparatus according to the present embodiment upon a format operation.

First, the recording and reproducing apparatus reads the recording medium 10 and displays an on-screen menu on the display unit 112 (S501).

Secondly, the controlling unit 110 of the recording and reproducing apparatus judges whether or not a format operation by the user has been received via the inputting unit 109 (S502).

In the case where the controlling unit 110 judges that the format operation by the user has been received (Yes in S502), the searching unit 116 searches the loaded recording medium 10 for a directory or a file incompatible with a recording standard of a menu currently being displayed (S503).

In the case where the searching unit 116 has found that the recording medium 10 contains a directory or a file incompatible with the standard with the menu currently being displayed (Yes in S503), an on-screen warning generated by the image generating unit 111 will be displayed on the display unit 11 (S504) to confirm with the user that any content item recorded on the recording medium 10 is being erased erroneously.

FIG. 7 shows an example of an on-screen warning displayed on the display unit 112 of the recording and reproducing apparatus 100 according to the present embodiment. For example, when the user performs the format operation via an on-screen menu compatible with an HDTV standard, the user will receive an on-screen warning 600 as a warning for erroneous erasure of content recorded using a different standard. The on-screen warning 600 shows a message such as "Any SDTV content item seems to be on the disc. Do you want to continue the format operation?"

As described above, the recording and reproducing apparatus 100 according to the present embodiment enables a user to securely avoid unintentional, erroneous erasure of an important content item recorded using an SDTV standard by providing a warning message on the display unit 112 when the user has checked only an HDTV standard menu and performed an operation to format a disc that is a medium having mixed content items recorded using the HDTV standard and the SDTV standard.

As the searching unit 116 searches for a folder compatible with a different standard, such an on-screen warning can be displayed not whenever the user performs a format operation but only when a folder or a content item recorded using the different standard is recorded.

INDUSTRIAL APPLICABILITY

A recording and reproducing apparatus according to the present invention is applicable as a recording and reproducing apparatus for recording and reproducing audio and video on a portable recording medium, particularly as a DVD recorder, a BD/DVD-capable recorder, or a BD/DVD-capable video camera that records audio and visual data on a recording medium such as a semiconductor memory or an optical disc.

The invention claimed is:

1. A recording and reproducing apparatus for performing a process on a recording medium on which content items having different resolutions are recordable, the recording and reproducing apparatus comprising:
   a detecting unit configured to detect a format operation instruction to erase entire contents of the recording medium; and
   a warning unit configured to issue a warning when said detecting unit detects the format operation instruction to erase the entire contents of the recording medium, the warning indicating whether or not the recording medium contains a content item having a resolution different from a resolution of a content item upon which the format operation instruction to erase the entire contents of the recording medium is received.

2. The recording and reproducing apparatus according to claim 1, further comprising:
   a searching unit configured to search the recording medium, when said detecting unit detects the format operation instruction to erase the entire contents of the recording medium, for the content item recorded at the different resolution,
   wherein said warning unit is configured to issue the warning only when said searching unit finds the content item recorded at the different resolution.

3. The recording and reproducing apparatus according to claim 1,
   wherein said detecting unit is configured to detect the format operation instruction to erase the entire contents of the recording medium, the format operation instruction to erase the entire contents of the recording medium being received via an on-screen menu compatible with a predetermined resolution.

4. The recording and reproducing apparatus according to claim 1,
   wherein said warning unit is configured to issue the warning by displaying an on-screen warning or emitting a beep.

5. A recording and reproducing apparatus for performing a process on a recording medium on which content items based on a plurality of standards are recordable, the recording and reproducing apparatus comprising:
   a detecting unit configured to detect a format operation instruction to erase entire contents of the recording medium; and
   a warning unit configured to issue a warning when said detecting unit detects the format operation instruction to erase the entire contents of the recording medium, the warning indicating whether or not the recording medium contains a content item compatible with a standard different from a standard of a content item upon which the format operation instruction to erase the entire contents of the recording medium is received.

6. The recording and reproducing apparatus according to claim 5, further comprising:
   a searching unit configured to search the recording medium, when said detecting unit detects the format operation instruction to erase the entire contents of the recording medium, for the content item recorded using the different standard, wherein said warning unit is configured to issue the warning only when said searching unit finds the content item recorded using the different standard.

7. A recording and reproducing method for performing a process on a recording medium on which content items having different resolutions are recordable, the recording and reproducing method comprising:

detecting a format operation instruction to erase entire contents of the recording medium; and issuing a warning when the format operation instruction to erase the entire contents of the recording medium is detected in said detecting, the warning indicating whether or not the recording medium contains a content item having a resolution different from a resolution of a content item upon which the format operation instruction to erase the entire contents of the recording medium is received.

8. The recording and reproducing method according to claim 7, further comprising:

searching the recording medium, when the format operation instruction to erase the entire contents of the recording medium is detected in said detecting, for the content item recorded at the different resolution, wherein said issuing of the warning is performed only when the content item recorded at the different resolution is found in said searching.

9. A non-transitory computer-readable storage medium having stored thereon a program for a recording and reproducing apparatus for performing a process on a recording medium on which content items having different resolutions are recordable, the program causing a computer to execute a method comprising:

detecting a format operation instruction to erase entire contents of the recording medium; and issuing a warning when the format operation instruction to erase the entire contents of the recording medium is detected in said detecting, the warning indicating whether or not the recording medium contains a content item having a resolution different from a resolution of a content item upon which the format operation instruction to erase the entire contents of the recording medium is received.

10. The non-transitory computer-readable storage medium having stored thereon the program according to claim 9, the program causing the computer to execute the method further comprising:

searching the recording medium, when the format operation instruction to erase the entire contents of the recording medium is detected in said detecting, for the content item recorded at the different resolution, wherein said issuing of the warning is performed only when the content item recorded at the different resolution is found in said searching.

11. The recording and reproducing apparatus according to claim 2, wherein said detecting unit is configured to detect the format operation instruction to erase the entire contents of the recording medium, the instruction being received via an on-screen menu compatible with a predetermined resolution.

12. The recording and reproducing apparatus according to claim 2, wherein said warning unit is configured to issue the warning by displaying an on-screen warning or emitting a beep.

\* \* \* \* \*